Figure 1:
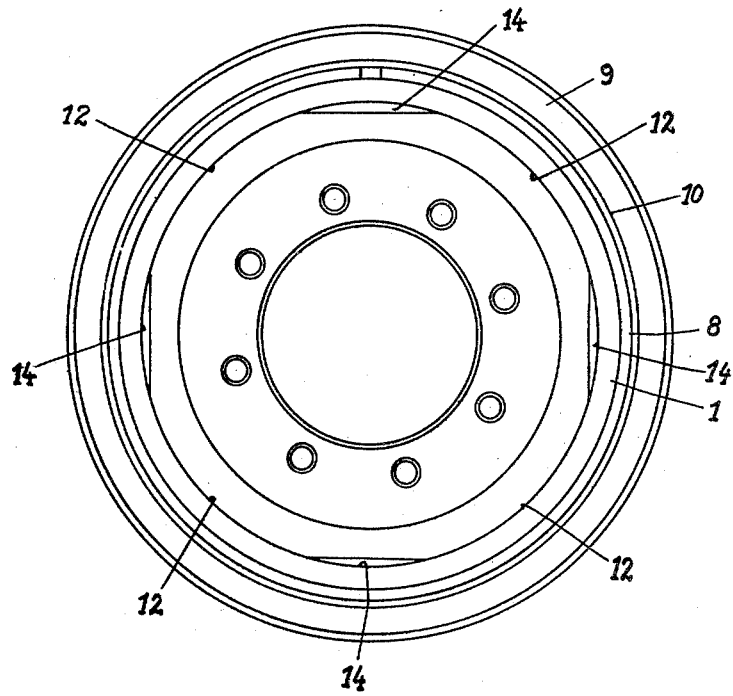

Feb. 1, 1955    P. LEMMERZ    2,700,999
WHEEL RIM ASSEMBLY FOR PNEUMATIC TIRES
Filed Dec. 5, 1950

Inventor:
Paul Lemmerz
By ︎ ︎ Atty

United States Patent Office 2,700,999
Patented Feb. 1, 1955

2,700,999

WHEEL RIM ASSEMBLY FOR PNEUMATIC TIRES

Paul Lemmerz, Konigswinter, Germany

Application December 5, 1950, Serial No. 199,207

Claims priority, application Germany December 12, 1949

4 Claims. (Cl. 152—410)

The present invention relates to a wheel rim having inclined shoulders such that the tire shoulders or beads are supported on two inclined surfaces extending at about 5° from the rim base. By means of this arrangement, the tire is more firmly seated than when the known flat base rim is used.

The side ring to be released when a tire is being fitted consists of two component parts, viz., a ring which is substantially wedge-shaped in cross-section and which serves to support one of the tire shoulders or beads, and the side ring proper, which bears laterally against the tire and is secured in position by a split ring or the like. The splitting up of the side ring into two separate rings has the advantage that the resistance to bending of each individual ring is smaller than with the manufacture of a side ring with an inclined shoulder made from only a single section. However, with the resistance to bending of the side ring, the difficulties to be overcome in the fitting and removal of a tire are also increased.

According to this invention the side ring is not positioned laterally in front of the wedge ring, but engages over the latter, as viewed radially of the wheel axis, and fits on the horizontal seating surface of the wedge ring. By this means, the wedge ring itself is given a greater rigidity and a better seating for the side ring is assured. With the construction according to the invention, it is therefore, possible, when removing a tire, to displace the side ring towards the middle of the rim base independently of the wedge ring. This can be effected by striking it with a heavy object. Simultaneously with the displacement of the side ring, the tire shoulder or bead is separated from the wedge-shaped ring. After the removal of the split ring, the wedge ring, which is also split, can also be removed without effort. The side ring is then withdrawn and the tire can be separated in known manner from the wheel rim.

The fitting of a new tire is carried out in the reverse sequence. The tire is placed over the rim and pressed so far back by means of the loose side ring until the wedge ring can be comfortably placed in position. Then the split ring is fitted and, as the tire is inflated, the tire shoulder or bead is displaced over the wedge ring and laterally against the side ring, which in turn is supported against the split ring and engages over the latter with one shoulder. An involuntary loosening of any one of the rings is thus impossible so long as the tire is under pressure.

In order that the wedge ring, during the fitting of the tire, shall take up the correct position from the outset and will not slide too far towards the middle of the rim base, it is conveniently fitted in a shallow recess, the bearing surface towards the outside of the wheel coinciding exactly with the edge of the groove for the sealing ring. Thus, it is possible to be certain in positioning the parts that the ring forming the inclined shoulder is correctly seated.

A particular advantage of the invention resides in the fact that all parts can be produced by conventional rolling equipment, thus eliminating the need for costly changes.

Figure 2:
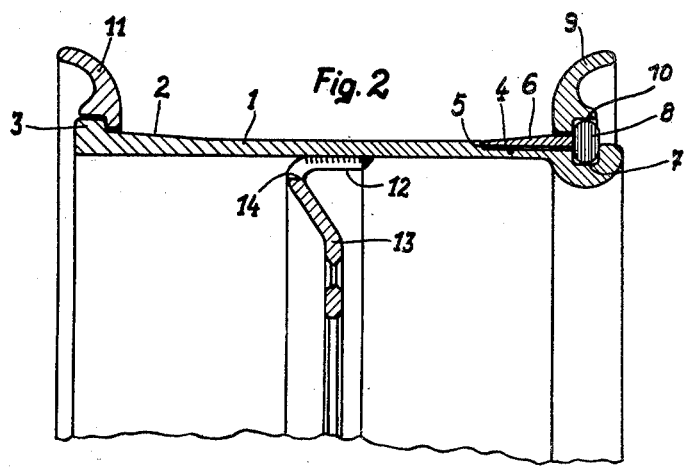

One constructional embodiment of the invention is shown, by way of example, in the accompanying drawing, wherein:

Fig. 1 is a side elevation of a wheel rim, and
Fig. 2 is a section through part of the wheel rim on a larger scale.

The base of the rim consists of a tubular or annular section 1, provided at one side with a sloping shoulder 2 which is bounded laterally by a peripheral beaded edge 3. At its other side, the section 1 has a shallow recess 4 which extends inwards up to a substantially perpendicular shoulder 5, and which serves to accommodate a cross-sectionally wedge-shaped split ring 6. Near to the right hand edge of the rim section, there is provided a groove 7 adapted to accommodate a split locking ring 8. The purpose of the split ring 8 is to restrict the lateral displacement of the side ring 9 which is formed with a shoulder 10 adapted to engage over the split ring 8 and to prevent undesired loosening of the latter. It is essential that the side ring 9 should engage over the wedge ring 6, viewed radially of the axis of the wheel, and such side ring is therefore seated on the horizontal bearing surface of the wedge ring. The split wedge ring 6, the inner edge of which abuts against the shoulder 5 and the outer edge against the split ring 8 and which is disposed beneath the side ring 9, is thus quite firmly and immovably located in the recess 4. Only after the side ring 9 has been displaced towards the centre of the rim base can the split ring 8 and then the wedge ring 6 be removed. After both rings 8 and 6 have been removed, the side ring 9 can also be removed.

At the opposite side the rim section is also bounded by a side ring 11, which is also loose in this construction and which conforms in shape and size to the ring 9 at the other side. The two rings 11 and 9 are thus interchangeable, and this may be of advantage in certain constructions. If desired, however, the side ring 11 may be in one piece with the rim base section 1.

The rim is welded to the wheel disc 13 at 12, the disc being made of a quadractic plate, the length of the edge of which is less than the inside diameter of the rim 1. Therefore, only the four corners of the disc are connected at 12 to the rim 1, and segment-shaped openings 14 remain between them. It is shown in practice that the strength of the wheel is not detrimentally affected thereby. On the other hand, there is a saving in material and the less expensive strip material can be used instead of bar material and the cooling of the brake drums is favoured.

I claim:

1. As an article of manufacture, a wheel rim having an integrally formed inclined shoulder and a peripheral bead adapted to receive a complementally formed side ring on one edge of the rim, and the opposite edge of the rim formed with an annular groove spaced from the edge of the rim and an annular recess extending inwardly of the groove on the outer peripheral surface of the rim, and said recess adapted to receive a wedge-shaped ring having an inclined surface and another side ring similar to the aforesaid side ring but reversed thereto and adapted for mounting upon the wedge-shaped ring, the inclined surface of said wedge-shaped ring being oppositely inclined to the aforesaid inclined shoulder, and said groove adapted to receive a split ring complementally formed to the groove and a shoulder of the side ring adapted to be detachably affixed by the split ring.

2. As an article of manufacture, a wedge-shaped ring for a tire rim having an inclined shoulder and peripheral bead on one edge of the rim to receive a detachable side ring complementally formed to the inclined shoulder and bead of the rim and said rim on the opposite edge formed with an annular recess forming a shoulder with the outer periphery of the rim and a contiguous annular groove to receive a split ring, said wedge-shaped ring complementally formed to the recess for detachably mounting therein between the shoulder and the split ring and in abutting relationship therewith, the upper peripheral face of the wedge-shaped ring being oppositely inclined to the opposite inclined shoulder of the rim when mounted within the recess, and further complementally formed to the inner peripheral surface of the side ring whereby the side ring may be axially movable thereover, and said inner peripheral surface of the wedge-shaped ring and the edge of the rim contiguous to the recess within which the wedge-shaped ring is mounted being complementally formed to permit axial movement of the wedge-shaped ring with respect to the rim in the mounting and dismounting thereof in the recess of the rim.

3. A separable rim assembly for pneumatic tires comprising an endless tubular rim base having at one end thereof an integrally formed inclined shoulder, a first endless annular tire-retaining side ring extending from the edge of said shoulder, the opposite end of said rim base being formed with an annular groove spaced from the edge of such opposite end and an annular recess extending axially of such groove along the outer peripheral surface of said rim base, a cross-sectionally wedge-shaped annular split ring positioned in said recess and having an outer surface which is inclined oppositely to the inclination of said inclined shoulder, a split locking ring positioned in said groove in abutment with one end of said wedge-shaped ring to retain said wedge-shaped ring in position axially within said recess, a detachable endless annular tire-retaining side ring, said detachable side ring having an inner annular surface engaging said wedge-shaped split ring to hold said wedge-shaped split ring radially in position within said recess and also forming a shoulder engaging said split locking ring to hold said locking ring radially in position within said groove.

4. The structure and cooperation of parts as set forth in claim 3, comprising a peripheral bead extending from said integrally formed inclined shoulder, said first tire-retaining side ring extending detachably from said bead, said tire-retaining side rings being of similar configuration and being interchangeable.

References Cited in the file of this patent

UNITED STATES PATENTS

| Number | Name | Date |
|---|---|---|
| 913,253 | Baker | Feb. 23, 1909 |
| 943,029 | Litchfield | Dec. 14, 1909 |
| 1,162,216 | Booth | Nov. 30, 1915 |
| 1,166,972 | Darrow | Jan. 4, 1916 |
| 1,493,040 | Klaus | May 6, 1924 |
| 1,499,739 | Klaus et al. | July 1, 1924 |
| 1,961,095 | Baker et al. | May 29, 1934 |
| 2,410,573 | Eksergian | Nov. 5, 1946 |
| 2,563,748 | Riggs | Aug. 7, 1951 |